United States Patent [19] [11] 3,716,598
Markovitz [45] Feb. 13, 1973

[54] HARDENABLE EPOXY RESIN COMPOSITIONS
[75] Inventor: Mark Markovitz, Schenectady, N.Y.
[73] Assignee: General Electric Company
[22] Filed: Oct. 28, 1971
[21] Appl. No.: 193,550

[52] U.S. Cl..........260/831, 260/2 EC, 260/30.4 EP, 260/47 EC, 260/830 TW
[51] Int. Cl. ............................................C08g 45/08
[58] Field of Search ................260/2 EP, 47 EP, 831

[56] References Cited

UNITED STATES PATENTS 3,622,524  11/1971  Markovitz et al. ................260/2 EC
3,637,902  1/1972   Dukes ..............................260/47 EC

OTHER PUBLICATIONS

Chemical Abstracts Vol. 70, 1969 Abstract No. 47,920K Matsuda, S. et al. Polymerization of Ethylene Oxide by Organo Tin Compounds

*Primary Examiner*—Paul Lieberman
*Attorney*—William C. Crutcher et al.

[57] ABSTRACT

The cure rate of 1,2-epoxy resins containing more than one epoxy group per molecule can be controlled over a wide range of times by a catalytic hardener comprising from 0.05 to 10 percent based on the weight of the epoxy resin of a bis(triorganotin) oxide and from 0.1 to 15 percent by weight of the epoxy resin of a phenolic accelerator.

6 Claims, No Drawings

HARDENABLE EPOXY RESIN COMPOSITIONS

This invention relates to epoxy resins, and more specifically to epoxy resins whose curing or hardening rate may be controlled over a broad range of times by the use of certain catalytic hardeners in combination with an accelerator.

There are many epoxy resin hardeners currently in use. Among the most common are the aromatic polyamines, aliphatic polyamines and their adducts, carboxylic acid anhydrides, polyamides and catalytic curing agents, as for example tertiary amines, imidazoles, $BF_3$ monoethylamine, and dicyandiamide. These hardeners have many useful properties, but each has its limitations. For example, epoxy resins cured with polyamines and polyamides are very reactive towards certain types of epoxy resins and cure very rapidly, but the cured product normally has poor electrical insulation properties. The pot life of epoxy-anhydride resins is usually relatively short at room temperature. The catalytic curing agents are normally limited by their very high reactivity at the cure temperature and by the poor high temperature electrical properties of the cured resins. A characteristic of almost all of the hardeners for epoxy resins is that their reactivity can be controlled only over a very narrow range.

It is an object of the present invention to provide a hardener for epoxy resins which requires no solvent and the reactivity of which can be controlled over a very wide range, i.e., from instant gelation to stability for more than one year. It is an additional object of this invention to provide a class of hardeners for epoxy resins which produces a tough cured resin having excellent electrical properties which are retained at elevated temperatures.

These and other objects of the invention are achieved by the utilization as a catalytic hardening agent for the epoxy resin of a bis(triorganotin) oxide in quantities of from about 0.05 to 10.0 percent by weight of the epoxy resin and from 0.1 to 15 percent by weight of a phenolic accelerator. Epoxy resin compositions containing the present hardeners possess a reactivity that can be controlled over an extremely wide range, from instant gelation at elevated temperatures to stability for more than one year at room temperature. The control of reactivity may be affected by the choice of specific epoxy resin and hardener used and by their proportions.

The bis(triorganotin) oxides of the present invention have the following formula

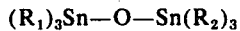
$(R_1)_3Sn—O—Sn(R_2)_3$ in which $R_1$ and $R_2$ are the same or different alkyl, cycloalkyl, aryl or alkaryl groups. The alkyl group may, for example, be methyl, ethyl, propyl or butyl; the cycloalkyl group may be cyclopropyl, cyclobutyl, cyclopentyl or cyclohexyl; the aryl group may be phenyl; and the alkaryl group may be methyl phenyl. A particularly preferred catalytic curing agent is bis(tri-n-butyltin) oxide

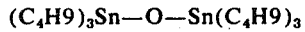
$(C_4H_9)_3Sn—O—Sn(C_4H_9)_3$

The bis(triorganotin) oxides are used in small catalytic quantities of about 0.05 to 10 percent, based upon the weight of the epoxy resin. Optimum results have been achieved with from 0.10 to 5.0 percent. It is important to note that the bis(triorganotin) oxides of the invention are catalytic hardeners, which do not in a significant way become a part of the hardened epoxy molecule as do curing agents added in much larger or near stoichiometric amounts.

Among the phenolic accelerators which can be effectively used in this invention are bisphenol A (i.e., 2,2-bis(4-hydroxyphenyl) propane), pyrogallol, dihydroxydiphenyls as well as ortho-, meta-, and para- hydroxybenzaldehydes (such as salicylaldehyde), catechol, resorcinol, hydroquinone, and phenol-formaldehyde and resorcinolformaldehyde condensates. Examples of other phenolic accelerators suitably employed in this invention also include halogenated phenols such as ortho-, meta-, and para-chlorophenols or bromophenols, and ortho-, meta-, and para-nitrophenols. Desirably, the phenolic accelerator is present in concentrations between 0.1 and 15 percent by weight of the epoxy resin with optimum cure rates being produced with phenolic accelerator concentrations between 0.5 and 5 percent by weight of the epoxy resin. As in the case of the bis(triorganotin) oxides, the phenolics are added in relatively small amounts because they are accelerators or catalysts rather than curing agents of the stoichiometric type which form a significant reaction with the epoxy resin and become a significant part of the epoxy molecule.

The epoxy resin employed in this invention can be any 1,2-epoxy resin having more than 1 epoxy group per molecule and includes cycloaliphatic epoxy resins, such as 2,4-epoxycyclohexylmethyl-(3,4-epoxy) cyclohexane carboxylate (sold under the trademarks ERL 4221 by Union Carbide Plastics Company or Araldite CY 179 by Ciba Products Company), bis(3,4-epoxy-6-methylcyclohexylmethyl) adipate (sold under the trademarks ERL 4289 by Union Carbide Plastics Company or Araldite CY 178 by Ciba Products Company), vinylcyclohexene dioxide (ERL 4206 made by Union Carbide Plastics Company), bis(2,3-epoxycyclopentyl) ether resins (sold under the trademark ERL 4205 by Union Carbide Plastics Company), 2-(3,4-epoxy) cyclohexyl-5,5-spiro(3,4-epoxy)-cyclohexane-m-dioxane (sold under the trademark Araldite CY 175 by Ciba Products Company); glycidyl ethers of polyphenol epoxy resins, such as liquid or solid bisphenol A diglycidyl ether epoxy resins (such as those sold under trademarks as Epon 826, Epon 828, Epon 830, Epon 1001, Epon 1002, Epon 1004, etc. by Shell Chemical Company), phenol-formaldehyde novolac polyglycidyl ether epoxy resins (such as those sold under the trademarks DEN 431, DEN 438, and DEN 439 by Dow Chemical Company), epoxy cresol novolacs (such as those sold under the trademarks ECN 1235, ECN 1273, ECN 1280 and ECN 1299 by Ciba Products Company), resorcinol glycidyl ether (such as ERE 1359 made by Ciba Products Company) tetraglycidoxy tetraphenylethane (Epon 1031 made by Shell Chemical Company); glycidyl ester epoxy resins such as diglycidyl phthalate (ED-5661 by Celanese Resins Company), diglycidyl tetrahydrophthalate (Araldite CY 182 by Ciba Products Company) and diglycidyl hexahydrophthalate (Araldite CY 183 made by Ciba Products Company or ED-5662 made by Celanese Resins Company); and flame retardant epoxy resins such as halogen containing bisphenol A diglycidyl ether epoxy resins (e.g., DER 542 and DER 511 which have bromine contents of 44–48 and 18–20 percent respectively and are made by Dow Chemical Company).

The foregoing epoxy resins are well known in the art and are set forth, for example, in many patents -- including U.S. Pat. Nos. 2,324,483, 2,444,333, 2,494,295, 2,500,600 and 2,511,913. Moreover, it often is advantageous to employ mixtures of these epoxy resins, e.g., a glycidyl ether epoxy resin such as Epon 828 with a cycloaliphatic epoxy resin such as ERL 4221, to control the cure rate of the thermosetting resin. The hardeners of this invention are not only effective with various epoxy resins and mixtures of epoxy resins, but they are also effective in mixtures containing reactive and non-reactive epoxy diluents (or extenders), epoxy flexibilizers and fillers. Thus, while epoxy resin hardeners of the prior art are effective with only a select group of epoxy resins, the epoxy resin hardeners of this invention (to be more fully explained hereinafter) are effective for cross-linking all groups of epoxy resins.

The resin may be mixed with the catalytic hardener in any conventional fashion — either at room temperature or at elevated temperatures. The phenolic accelerator may be added either before or after the epoxy resin and catalytic hardener are mixed. Alternatively, the bis(triorganotin) oxide hardening agent may first be mixed with the phenolic accelerator or with more than one phenolic accelerator in various ratios to produce a combined hardening agent having the desired reactivity rate.

The following examples, in which all parts and percentages are by weight, are divided into several groups. The first group, Examples 1 thru 7, illustrate the relative times for gelation of epoxy resins of the invention hardened at elevated temperatures to demonstrate the reactivity of the curing agents. Reactivity at elevated temperatures was determined by placing 15 grams of the resin in a 2-inch diameter aluminum weighing dish into an air-circulating oven and checking for gelation every 5 or 10 minutes until gelation occurred.

EXAMPLE 1

ERL 4221 epoxy resin containing 1.0 to 5.0 parts of bis(tri-n-butyltin) oxide per 100 parts of the epoxy resin gelled very slowly at 160° C. The gel time at 160°C. The gel time at 160° C. was approximately 2½ hours. The castings were weak brittle solids even after 16 hours at 160° C. cure. No useful products were obtained from ERL 4221 and bis(tri-n-butyltin) oxide.

Three parts of a concentrated solution of bisphenol A in ERL 4221 epoxy resin were added to 98 parts of ERL 4221 to produce a 1 percent bisphenol A solution with the resin. 1, 2 and 3 parts respectively of bis(tri-n-butyltin) oxide were added. (ERL 4221 is an epoxy resin of the structural formula

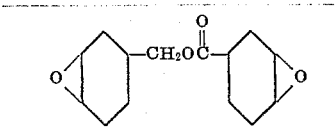

having an epoxide equivalent weight of 126 to 140.) Gel times at 150° C. were 40–50 minutes. Tough, hard solids resulted.

EXAMPLE 2

A 1 percent solution of BRZ 7541 phenol-formaldehyde novolac in ERL 4221 epoxy resin was prepared by heating the epoxy resin and then adding the phenol-formaldehyde novolac. (BRZ 7541 phenol-formaldehyde novolac is semisolid at room temperature, contains two to three phenolic OH groups per molecule, and is manufactured by the Union Carbide Plastics Company.) 1, 2 and 3 parts respectively of bis(tri-n-butyltin) oxide were then added to 100 parts of this 1 percent solution. Bis(tri-n-butyltin) oxide was also added to ERL 4221 in the form of a solution which was a viscous liquid at room temperature, prepared by heating and stirring a 50/50 mixture of the BRZ 7541 phenolic accelerator and the oxide catalyst at 75° C. 1, 2, 3, 4 and 5 parts of this 50/50 solution were added to 100 parts of ERL 4221 epoxy resin. All of the foregoing solutions gelled within 30 to 40 minutes.

EXAMPLE 3

Solutions were prepared of ERL 4221 epoxy resin containing 1 percent of BRPA 5570 phenol-formaldehyde novolac. (BRPA 5570 is a solid novolac resin containing 5 to 6 phenolic OH groups per molecule, made by the Union Carbide Plastics Company.) To 100 parts of these solutions were added 1, 2 and 3 parts respectively of bis(tri-n-butyltin) oxide. Gel times of 20, 25 and 30 minutes respectively at 150° C. were obtained.

EXAMPLE 4

Salicylaldehyde was used as the phenolic accelerator in this example. It is convenient to use because it is liquid at room temperature and is readily dissolved in ERL 4221 epoxy resin. To a hundred parts of ERL 4221 epoxy resin and 1 part of salicylaldehyde were added 0.10, 0.25, 0.50, 0.75, 1.0, 1.5 and 2 parts respectively of bis(tri-n-butyltin) oxide. All solutions gelled quickly at 160° C., the gel times ranging from 15 to 20 minutes.

EXAMPLE 5

To a 100 parts of a solution containing 3 parts of BRR 5555 novolac resin (a solid phenol-formaldehyde novolac sold by Union Carbide Plastics Company) in ERL 4221 epoxy resin were added from 0.5 to 3.0 parts of the bis(tri-n-butyltin) oxide catalyst. All solutions gelled within 15 to 20 minutes at 160°C.

EXAMPLE 6

Catechol-accelerated resins were found to be very reactive. To a hundred parts of ERL 4221 epoxy resin was added 1 part of catechol and 0.5, 1.0, 2.0 and 3.0 parts of bis(tri-n-butyltin) oxide catalyst. Tough, clear solids were obtained when these solutions were gelled at 100° C., the gel times ranging from 10 to 23 minutes. Gelation at 150°–160° C. was instantaneous.

EXAMPLE 7

Glycidyl ether and glycidyl ester epoxy resins were less reactive toward the bis(tri-n-butyltin) oxide-phenolic hardeners than cycloaliphatic epoxy resins, such as the ERL 4221 used in the above examples. The glycidyl ether and ester resins were gelled with 1 to 5 parts of catechol or 5 to 15 parts of a novolac and from 0.1 to 3.0 parts of the bis(tri-n-butyltin) oxide catalyst in from 5 to 40 minutes at 160° C. Tough, hard solids resulted. Glycidyl ether or glycidyl ester epoxy resins containing 1.0 to 5.0 parts of bis(tri-n-butyltin) oxide per 100 parts of epoxy resin but no phenolic accelerator did not gel even after 8 hours at 160° C. The resins were liquids or soft tacky solids after 15 hours at 160° C.

The following examples, 8 thru 14, illustrate the pot life stability of epoxy resins cured with the catalytic hardeners and phenolic accelerators of the present invention at room temperature. Most of these resins were stable for many months at room temperature before gelation occurred and all were stable for many days.

EXAMPLE 8

To a hundred parts of ERL 4221 epoxy resin was added 1 part of catechol and 0.10, 0.20, 0.30, 0.40, 0.50, 1.0, 2.0 and 3.0 parts of bis(tri-n-butyltin) oxide respectively. The gel time at 25° C. ranged from 20 to 26 days for these systems. When the amount of catechol was increased to 2 parts per 100 parts of ERL 4221 with 1 part of bis(tri-n-butyltin) oxide, gelation occurred in 6 days at 25°C.

EXAMPLE 9

To a hundred parts of ERL 4221 epoxy resin was added 1 parts of salicylaldehyde and 1.0, 2.0 and 3.0 parts of bis(tri-n-butyltin) oxide. The gel time at 25° C. was from 28 to 34 days.

EXAMPLE 10

A liquid concentrate was prepared by dissolving 25 parts of BRZ 7541 phenol-formaldehyde novolac in 75 parts of ERL 4221 epoxy resin at 75° to 100° C. Five parts of this concentrate were added to 100 parts of ERL 4221 epoxy resin, and to this solution were added 1.0, 2.0, 3.0 and 4.0 parts of bis(tri-n-butyltin) oxide respectively. The gel time at 25° C. ranged from 80 to 283 days.

EXAMPLE 11

A viscous liquid hardener was prepared by heating and blending a 50:50 mixture of bis(tri-n-butyltin) oxide and BRZ 7541 novolac accelerator. The pot life stability of resins containing this hardener was longest at approximately 1.0 part content of the combination catalyst and accelerator. At this concentration, the gel time at 25° C. was 295 days. With 0.5 part of the catalyst accelerator concentrate, the gel time at 25° C. was 163 days. With 2.0, 3.0 and 4.0 parts of this concentrate, the gel time at 25° C. ranged from 182 to 245 days.

EXAMPLE 12

A liquid concentrate of bisphenol A in ERL 4221 epoxy resin was prepared by heating and stirring a 1:2 mixture at 105° to 160° C. Three parts of this concentrate were added to 98 parts of ERL 4221 epoxy resin and 1.0, 2.0 and 3.0 parts respectively of bis(tri-n-butyltin) oxide catalyst were added. The gel times ranged from 84 (with 1.0 part catalyst) to 258 (with 3.0 parts catalyst) days at 25°C.

EXAMPLE 13

A liquid concentrate was prepared of equal parts of BRZ 7541 phenol-formaldehyde novolac and Epi-Rez 5014 epoxy resin (p-tertiary butyl phenyl glycidyl ether, epoxide equivalent weight 225, Celanese Plastics Company). The concentrate was prepared by heating and stirring a 50:50 mixture at 75° to 100° C. Two parts of this concentrate were added to 98 parts of ERL 4221 epoxy resin, and 0.5, 1.0 and 2.0 parts of bis (tri-n-butyltin) oxide catalyst were added respectively. They produced resins with excellent pot life stabilities. At 25° C., no gelation occurred after 323 days, 315 days and 127 days respectively. The viscosity at 25° C. after 323 days (0.5 part catalyst) at 25° C. was 5.50 stokes. The gelation time at 160° C. after 323 days at 25° C. was 40 minutes for the resin containing 0.5 part of catalyst.

EXAMPLE 14

Solid novolac BRR 5555 phenolic accelerator was ground to a fine powder and added to ERL 4221 epoxy resin. One part by weight of the BRR 5555 phenolic dissolved at room temperature in the expoxy resin by agitating the mixture on a roller. 1.0, 2.0 and 3.0 parts of bis (tri-n-butyltin) oxide respectively were added to this mixture. They remained low-viscosity liquids after 348 to 350 days at room temperature – 25° C. The viscosity at 25° C. after 350 days at 25° C. for the mixtures to which were added 1.0 and 2.0 parts of the bis(tri-n-butyltin) oxide catalyst was 9.77 and 11.8 stokes respectively. The gel time for these two resin solutions at 160° C. after 350 days at 25° C. was 40 minutes and 25 minutes respectively.

The foregoing examples demonstrate that solventless resins with excellent stability at ambient temperatures can be formulated with bis(tri-n-butyltin) oxide catalysts and phenolic accelerators. These resins gelled rapidly at 150° to 160° C. and had excellent electrical properties.

The following examples, 15 thru 20, illustrate the excellent dissipation factors obtained with epoxy resins cured in accordance with the invention. The examples show the dissipation factor at 60 Hz (Hertz or cycles per second) and 10 VPM (volts per mil) vs. temperature for a number of epoxy resins cross-linked by bis(tri-n-butyltin) oxide and phenolic hardeners in accordance with the invention.

EXAMPLE 15

Tangent δ(dissipation factor) values were determined at 25°, 100°, 150° and 160° C. for a hundred parts of ERL 4221 epoxy resin containing 3 parts of BRR 5555 novolac accelerators to which were added 0.5, 1.0, 2.0 and 3.0 parts respectively of bis(tri-n-butyltin) oxide. They were cured for 45 minutes at 140° C. and then for 4 hours at 160° C. The tangent δ values were as follows:

| Temperature °C. | Tan δ (60 Hz, 10 VPM) |
|---|---|
| 25 | 0.0050 |
| 100 | 0.0106–0.0116 |
| 150 | 0.0172–0.0189 |
| 160 | 0.0178–0.0190 |

EXAMPLE 16

To a hundred parts of ERL 4221 epoxy resin and 1 part of catechol was added 0.1 and 0.2 parts respectively of bis(tri-n-butyltin) oxide. The resins were cured for 1 hour at 100° C., 1 hour at 140° C., and 4 hours at 160°C. The results were as follows:

| Temperature °C. | Tan δ (60 Hz, 10 VPM) |
|---|---|
| 25 | 0.0049 |
| 100 | 0.0092–0.0095 |
| 150 | 0.0129–0.0136 |
| 160 | 0.0133–0.0139 |

EXAMPLE 17

Dissipation factors were again very low for an ERL 4221 epoxy resin catalyzed with 3 parts of a concentrate containing ERL 4221 epoxy resin and bisphenol A in proportions of 2 to 1, with 1.0, 2.0, and 3.0 parts respectively of bis(tri-n-butyltin) oxide. These resins were cured for 5 hours at 150° C. The tan δ values ranged from 0.0043 at 25° C. to 0.0219 at 155° C.

EXAMPLE 18

ERL 4221 resins were catalyzed with a mixture of 3 parts and 5 parts respectively of a 50:50 mixture of BRZ 7541 novolac and bis(tri-n-butyltin) oxide. They were cured for 5 hours at 150° C. The tan δ values at 25 and 155° C. ranged from 0.0040 to 0.0182 respectively.

EXAMPLE 19

To 98 parts of ERL 4221 epoxy resin were added 2 parts of a concentrate containing a 50:50 mixture of Epi Rez 5014 epoxy resin and BRZ 7541 phenol-formaldehyde novolac. 0.5 and 1.0 parts respectively of bis (tri-n-butyltin) oxide were added to these mixtures. They were cured for 8 hours at 150° C. The tan δ values at 25°, 100°, 150° and 160° C. ranged from a low of 0.0067 at 25° C. to a high of 0.0487 at 160° C.

EXAMPLE 20

To a hundred parts of ERL 4221 epoxy resin were added 5 parts of a 75/25 mixture of ERL 4221 epoxy resin and BRZ 7541 novolac. To this mixture were added 1.0, 2.0, 3.0 and 4.0 parts respectively of bis(tri-n-butyltin) oxide. All mixtures were cured for 8 hours at 150° C. The tan δ values ranged from a low of 0.0049 to a high of 0.0396 at temperatures of 25°, 100°, 150° and 160° C.

Heat distortion temperatures at 264 psi were determined for a number of resin samples. Each of the samples was 5 inches × ½ inch × ½ inch. The samples tested included ERL 4221 epoxy resin cured with bis(tri-n-butyltin) oxide and either catechol, BRR 5555 solid novolac, BRZ 7541 novolac or bisphenol A. The heat distortion temperatures of these resins were generally high, the highest being obtained for the ERL 4221 epoxy resin-catechol-bis (tri-n-butyltin) oxide resins in which the heat distortion temperatures were within 169° to 179° C. range.

From the foregoing, it will be evident that the invention provides a hardenable epoxy resin composition, the reactivity of which can be controlled over a wide range by varying the kind and amount of phenolic accelerator used. Solventless 1-part resins may be formulated which remain low-viscosity liquids after many months at room temperature but which gel rapidly at 150° to 160° C. The cured resins are tough, clear solids with excellent electrical properties at 25° C. to at least 160° C. High heat distortion temperatures may be obtained. The properties of the resins make them particularly suitable for vacuum-pressure impregnation resins and electrical grade prepregs in which tapes, fibers and cloth containing a resin are shaped and heated to cure the resin and lock the shape.

I claim:
1. A hardenable epoxy resin composition comprising an epoxy resin containing 1,2-epoxy groups and more than 1 epoxy group per molecule,
    from about 0.05 to 10 percent by weight of said epoxy resin of bis(triorganotin) oxide having the formula

$$(R_1)_3Sn-O-Sn(R_2)_3$$

in which $R_1$ and $R_2$ are the same or different alkyl, cycloalkyl, aryl or alkaryl groups as a catalytic hardener for said epoxy resin, and
    from about 0.1 to 15 percent by weight of said epoxy resin of a phenolic accelerator.

2. The hardenable epoxy resin composition of claim 1 in which the bis(triorganotin) oxide is bis(tri-n-butyltin) oxide.

3. The hardenable epoxy resin composition of claim 1 comprising from about 0.10 to 5.0 percent by weight of said epoxy resin of bis(triorganotin) oxide.

4. The hardenable epoxy resin composition of claim 1 comprising from about 0.5 to 5.0 percent by weight of said epoxy resin of a phenolic accelerator.

5. The hardenable epoxy resin composition of claim 1 in which the epoxy resin is a cycloaliphatic epoxy resin.

6. The hardenable epoxy resin composition of claim 1 in which the phenolic accelerator is selected from the group consisting of phenol-formaldehyde novolac, salicylaldehyde and catechol.

* * * * *